Nov. 18, 1941.                W. C. SPEAR                2,262,866
             DELAYED-START CONNECTION FOR ELECTRIC MOTORS AND THE LIKE
                              Filed Jan. 10, 1940

DIRECT HEAT-RECEIVING RELATIONSHIP TO MOTOR

DIRECT HEAT-RECEIVING RELATIONSHIP TO MOTOR

WITNESSES:
E. A. McCloskey.
N. W. L. Groove

INVENTOR
Wendell C. Spear.
BY O. B. Buchanan
ATTORNEY

Patented Nov. 18, 1941

2,262,866

UNITED STATES PATENT OFFICE 2,262,866

DELAYED-START CONNECTION FOR ELECTRIC MOTORS AND THE LIKE

Wendell C. Spear, Wapakoneta, Ohio, assignor to Westinghouse Electric & Manufacturing Company, East Pittsburgh, Pa., a corporation of Pennsylvania Application January 10, 1940, Serial No. 313,245

18 Claims. (Cl. 172—279)

My invention relates to delayed-connection devices, and particularly to electrical energy-translating devices which are subject to different temperature-conditions, and which are adapted to have a pause, or a time-delay, before becoming effectively energized after the application of electrical energy thereto. My invention was particularly designed in order to effect a delayed starting of a small single-phase induction-motor which is utilized to drive a fan or blower for circulating air through what is known as a "unit" heater. The reason for the time-delay is to allow the heater to become thoroughly hot before blowing air through the heater, the time-delay period being initiated coincident with the initial energization of the heater, as by turning on the gas or other heating-medium.

The principal object of my invention is to provide a reliable and inexpensive time-delay connection for causing an electric motor, or other electrical device, to start, or to become effectively energized, after a time-delay after the application of electrical energy to the line-terminals of said motor or other electrical device.

A more specific object of my invention is to utilize, for such a time-delay device, a thermally responsive switch which is located in direct heat-receiving relation to the motor, or other electrical device to be controlled, said thermally responsive switch also having an electrical heating-element of its own, so that the time-delay which it interposes will not be as great when the motor, or other device, is initially hot, as when the motor, or other device, is initially cool, which is a very desirable feature in unit-heater motors, because it does not take the heater as long to become effectively heated when it is hot to start with.

A further object of my invention is to provide a time-delay motor-starting switch for starting an electric motor having a main running-winding and an auxiliary starting-winding, and also a start-run switching-means, operable after the motor has started, for disconnecting the auxiliary starting-winding and also altering the actuating-conditions controlling the time-delay switching-means.

Figure 1:
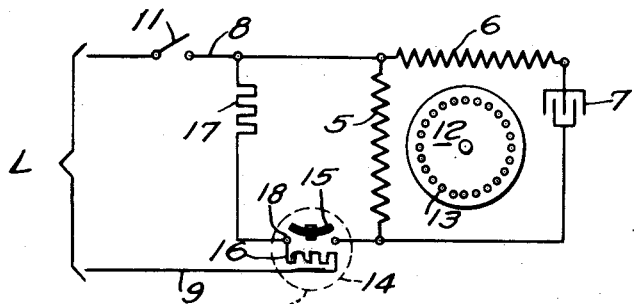
Figure 2:
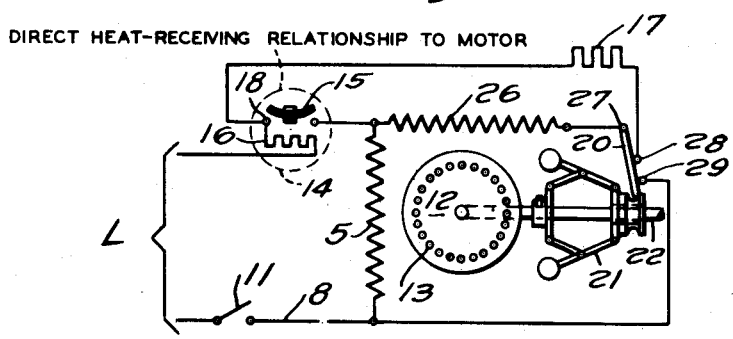

With the foregoing and other objects in view, my invention consists in the combinations, apparatus and methods hereinafter described and claimed, and illustrated in the accompanying drawing, wherein Figure 1 is a diagrammatic view of circuits and apparatus illustrating a novel form and connection of thermal starting-switch for energizing a self-starting single-phase induction-motor of a type utilizing a capacitor-winding for both starting and running, and Fig. 2 is a similar view illustrating the application of the thermal starting-switch to a self-starting single-phase motor utilizing a split-phase winding as the start-winding, and also having a centrifugal switch for not only deenergizing the starting-winding when the motor has started, but also altering the operating-connections for the thermal starting-switch.

In Fig. 1 I illustrate a self-starting single-phase induction-motor in the form of a capacitor-motor having a primary or stationary part having a main running-winding 5 and a substantially quadrature-related starting-winding 6, the latter being associated with a serially connected capacitor 7 so that it carries a current which is out of phase with the current in the main winding 5. These windings are connected to a pair of single-phase line-terminals 8 and 9 which may be connected to a source of electrical energy by any suitable means, such as an ordinary line-switch 11. The motor is also provided with a secondary or rotor-member 12 having a squirrel-cage winding 13 thereon, or any other polyaxially short-circuited induction-motor secondary winding.

Mounted in heat-exchanging relation to the motor, preferably on the stationary element which carries the windings 5 and 6, is a thermostatic or thermally responsive switch 14 consisting of a movable bimetallic switch-element 15 and an adjacent heating-resistance 16 in close, heat-exchanging relation to said bimetallic element. In carrying out my invention I also utilize an auxiliary resistor 17, or other current-consuming device.

In the particular form of embodiment of my invention shown in Fig. 1, the switch-contacts 15 of the thermally responsive device are serially connected in one of the line-terminals 9 of the motor, and the heating element 16 of the thermally responsive device is serially connected in the same line-terminal 9, at the line-side of the switch-contacts 15, while the auxiliary resistor 17 is connected between the line-side 18 of the switch-contacts 15 and the other line-terminal 8 of the motor. The bimetallic switch-contacts 15 are normally open, and are adapted to close when a predetermined temperature of the thermally responsive device 14 has been attained.

In operation, when electrical energy is applied to the line-terminals 8 and 9, from the line L, as by the closure of the line-switch 11, in Fig. 1, a circuit is first established through the heater 16 and the auxiliary resistor 17, this circuit being responsive to the line-voltage, heating the thermally responsive device 14 in accordance with the line-voltage. After a predetermined time-delay, which may be of the order of 30 or 60 seconds, the thermal contacts 15 are heated sufficiently to close, thereby applying the electrical energy to the motor-windings 5 and 6, and causing the motor to start.

It will be noted that when the motor is hot, to begin with, it will not take as long for the thermally responsive device 14 to attain the temperature necessary to close the contacts 15, as when the motor is initially cool, thereby inherently and automatically providing a longer time-delay when starting out with the apparatus cold, than when starting out with the apparatus hot, which is extremely desirable in unit-heater applications, as has been heretofore explained. It will be further noted that my time-delayed starting-control elements 14 and 17 are mounted as a unitary part of the motor, thereby avoiding the expense and complication of mounting separate control-devices and connecting up the wiring therefor.

It will be understood, of course, that the particular self-starting single-phase induction-motor which is illustrated in Fig. 1 is intended to be typical of any self-starting motor.

In Fig. 2, I illustrate my invention as being applied to a self-starting motor of a type having a start-run switch 20 which is diagrammatically illustrated as being controlled by a centrifugal device or speed-governor 21 mounted on the motor-shaft 22. In Fig. 2, the motor is provided with a main running-winding 5, the same as in Fig. 1, but the starting-winding 26 is a quadrature-related winding of a type known as a split-phase winding, which is adapted to have a different proportion of resistance and reactance so as to have a current which is out of phase with the current in the main winding 5. The centrifugally responsive start-run switch 20 is adapted, in its starting position, to make a connection between a terminal 27 of the split-phase starting-winding 26, and two stationary back-contacts 28 and 29, the contact 28 being connected, through the auxiliary resistor 17, to the line-side 18 of the bimetallic switch 15, while the back-contact 29 is connected to the other line-terminal 8.

In operation, when electrical energy is applied to the line-terminals 8 and 9 by the closure of the line-switch 11 in Fig. 2, a circuit is first completed, across the line, through the thermal-device heater 16, the auxiliary resistor 17 and the back-contacts 28 and 29 which are shunted by the centrifugal switch 20. At the end of the predetermined time-delay, the thermally responsive contacts 15 close, thereby applying power to the windings 5 and 26 of the motor, the winding 5 being directly energized, across the line-terminals 9 and 8, through the serially connected heating-resistance 16, while the auxiliary starting-winding 26 is connected in shunt with the main winding 5 by means of the back-contacts 28 and 29 which are shunted by the centrifugal switch 20.

The motor thus starts, and when it has attained a speed which is a predetermined proportion of its full-running speed, the centrifugal device 21 operates to open the switch-contact 20, thereby not only disconnecting both the starting winding 26 and the auxiliary resistor 17 from the line, but also disconnecting the auxiliary resistor 17 from the starting winding 26, the latter feature being desirable because, when the motor has attained something like its full speed, an electromotive force is generated in the starting winding, so that it would be undesirable to have this starting-winding shunted by the auxiliary resistance 17 during the running-conditions of the motor. The deenergization of the split-phase starting-winding 26, during the running-conditions of the motor, improves the efficiency and operation of the motor, while the deenergization of the auxiliary resistor 17 during the running-operation of the motor avoids the constant power-loss through said resistor, and thus improves the overall efficiency of the motor, and at the same time it makes it possible to utilize a less expensive temporary-duty resistor 17.

The disconnection of the auxiliary resistor 17 during the running-condition of the motor also serves to change the operating-law of the thermally responsive switch 14 so that, whereas the initial time-delay was obtained as a result of a response to the line-voltage, the thermal contacts 15, in Fig. 2, are held closed, during the normal running of the motor, solely in accordance with a motor-current response, said response being obtained by the heating resistance 16 which is connected in series with the motor, in the line-terminal 9 thereof.

It is necessary to design the heating-resistance 16 so that it will be substantially uninjured by the high current in-rush therethrough when the switch contacts 15 first close and the motor-rotor 12 is at a standstill, and at the same time it is obviously necessary for the heating-resistance 16, and the critical temperature of the bimetallic strip 15, to be so designed and correlated that the heating-resistance 16 provides sufficient heat to hold the bimetallic contacts 15 closed during the relatively low-current conditions which obtain when the motor is running in its lowest-load condition.

While I have described and illustrated my invention in only two different illustrative forms of embodiment, I wish such description and illustration to be understood as being merely illustrative, and not as limiting my invention to these particular forms of embodiment, as I believe it to be obvious that the skilled workers of the art can make numerous changes, by way of additions and substitutions, without departing from the essential spirit of my invention, at least in its broader aspects. I desire, therefore, that the appended claims shall be accorded the broadest interpretation consistent with their language and the prior art.

I claim as my invention:

1. A delayed-connection device subject to different temperature-conditions, comprising, in combination with said device, line-terminals adapted to be energized, at times, with electrical energy for only a portion of said device, a thermally responsive switch having heat-actuated contacts operatively associated with said device in such manner as to effectively energize another portion of said device only after said contacts are actuated, said thermally responsive switch being located in direct heat-receiving relation to at least a portion of said device and also having an electrical heating-element of its own, and means for causing said heating-element of the thermally responsive switch to become electrically energized when said line-terminals first have electrical energy applied thereto.

2. A delayed-connection device subject to different temperature-conditions, comprising, in combination with said device, line-terminals adapted to be energized, at times, with electrical energy for only a portion of said device, a thermally responsive switch having initially open contacts operatively associated with said device in such manner as to effectively energize another portion of said device only after said contacts are closed, said thermally responsive switch being located in direct heat-receiving relation to at least a portion of said device and also having an electrical heating-element of its own, and means for causing said heating-element of the thermally responsive switch to become electrically energized when said line-terminals first have electrical energy applied thereto.

3. A delayed-connection device subject to different temperature-conditions, comprising, in combination with said device, line-terminals adapted to be energized, at times, with electrical energy, a thermally responsive switch having initially open contacts serially connected in one of said line-terminals, said thermally responsive switch being located in direct heat-receiving relation to at least a portion of said device and also having an electrical heating-element of its own, said heating-element of the thermally responsive switch being serially connected in said one of the line-terminals on the line-side of said initially open contacts, and an auxiliary current-consuming element connected between the line-side of said initially open contacts and another line-terminal of said device.

4. A delayed-start electric motor having a main running-winding, an auxiliary starting-winding, line-terminals adapted to be energized, at times, with electrical energy for said motor, a thermally responsive switch having initially open contacts serially connected in one of said line-terminals, said thermally responsive switch being located in direct heat-receiving relation to said motor and also having an electrical heating-element of its own, said heating-element of the thermally responsive switch being serially connected in said one of the line-terminals on the line-side of said initially open contacts, an auxiliary current-consuming device, and start-run means including circuit-conductors and switching-means operable after the motor has started; said start-run means, in its non-operated position, serving to connect said auxiliary current-consuming device between the line-side of said initially open contacts and another line-terminal of said motor, and at the same time serving to connect said starting-winding between a plurality of line-terminals of said motor; and said start-run means, in its operated position, serving to disconnect both said auxiliary current-consuming device and said starting-winding from the line-terminals.

5. A delayed-start electric motor having a main running-winding, an auxiliary starting-winding, line-terminals adapted to be energized, at times, with electrical energy for said motor, a thermally responsive switch having initially open contacts serially connected in one of said line-terminals, said thermally responsive switch being located in direct heat-receiving relation to said motor and also having an electrical heating-element of its own, said heating-element of the thermally responsive switch being serially connected in said one of the line-terminals on the line-side of said initially open contacts, an auxiliary current-consuming device, and start-run means including circuit-conductors and switching-means operable after the motor has started; said start-run means, in its non-operated position, serving to connect said auxiliary current-consuming device between the line-side of said initially open contacts and another line-terminal of said motor, and at the same time serving to connect said starting-winding between a plurality of line-terminals of said motor; and said start-run means, in its operated position, serving to disconnect both said auxiliary current-consuming device and said starting-winding from the line-terminals and from each other.

6. A delayed-start electric motor having a main running-winding, an auxiliary starting-winding, line-terminals adapted to be energized, at times, with electrical energy for said motor, a thermally responsive switch having initially open contacts serially connected in one of said line-terminals, said thermally responsive switch having an electrical heating element of its own, said heating-element of the thermally responsive switch being serially connected in said one of the line-terminals on the line-side of said initially open contacts, an auxiliary current-consuming device, and start-run means including circuit conductors and switching-means operable after the motor has started; said start-run means, in its non-operated position, serving to connect said auxiliary current-consuming device between the line-side of said initially open contacts and another line-terminal of said motor, and at the same time serving to connect said starting-winding between a plurality of line-terminals of said motor; and said start-run means, in its operated position, serving to disconnect both said auxiliary current-consuming device and said starting-winding from the line-terminals.

7. A delayed-start electric motor having a main running-winding, an auxiliary starting-winding, line-terminals adapted to be energized, at times, with electrical energy for said motor, a thermally responsive switch having initially open contacts serially connected in one of said line-terminals, said thermally responsive switch having an electrical heating element of its own, said heating-element of the thermally responsive switch being serially connected in said one of the line-terminals on the line-side of said initially open contacts, an auxiliary current-consuming device, and start-run means including circuit-conductors and switching-means operable after the motor has started; said start-run means, in its non-operated position, serving to connect said auxiliary current-consuming device between the line-side of said initially open contacts and another line-terminal of said motor, and at the same time serving to connect said starting-winding between a plurality of line-terminals of said motor; and said start-run means, in its operated position, serving to disconnect both said auxiliary current-consuming device and said starting-winding from the line-terminals and from each other.

8. A delayed-start electric motor having a main running-winding, an auxiliary starting-winding, line-terminals adapted to be energized, at times, with electrical energy for said motor, a time-delay switching-means having initially open contacts serially connected in one of said line-terminals, means for so actuating said time-delay switching-means as to cause it to begin its time-delay operation when said line-terminals first have electrical energy applied thereto, and start-run means including circuit-conductors and switching-means operable after the motor has started; said start-run means, in its non-operated position, serving to effect a predetermined actuating-connection of said time-delay switching-means, and at the same time serving to connect said starting-winding between a plurality of line-terminals of said motor; and said start-run means, in its operated position, serving to disconnect said starting-winding from the line-terminals, and also to alter the actuating-conditions controlling the said time-delay switching-means.

9. A delayed-connection device subject to different temperature-conditions, comprising, in combination with said device, line-terminals adapted to be energized, at times, with electrical energy, a thermally responsive switch having initially open contacts operatively associated with said device in such manner as to effectively energize at least a portion of said device only after said contacts are closed, said thermally responsive switch being located in direct heat-receiving relation to at least a portion of said device, and heating-means for directly heating said thermally responsive switch so as to cause its contacts to close; said heating means including line-voltage-responsive energizing-circuit means for initially heating the thermally responsive switch when said line-terminals first have electrical energy applied thereto, and including current-responsive energizing-circuit means for thereafter directly supplying heat to the thermally responsive switch in response to the current flowing in a line-terminal of said delayed-connection device.

10. A delayed-connection device subject to different temperature-conditions, comprising, in combination with said device, line-terminals adapted to be energized, at times, with electrical energy, a thermally responsive switch having initially open contacts operatively associated with said device in such manner as to effectively energize at least a portion of said device only after said contacts are closed, and heating-means for directly heating said thermally responsive switch so as to cause its contacts to close; said heating-means including line-voltage-responsive energizing-circuit means for initially heating the thermally responsive switch when said line-terminals first have electrical energy applied thereto, and including current-responsive energizing-circuit means for thereafter supplying heat to the thermally responsive switch in response to the current flowing in a line-terminal of said delayed-connection device.

11. A delayed-start electric motor having a main running-winding, an auxiliary starting-winding, line-terminals adapted to be energized, at times, with electrical energy for said motor, a thermally responsive switch having initially open contacts serially connected in one of said line-terminals, said thermally responsive switch being located in direct heating-receiving relation to said motor, heating-means for directly heating said thermally responsive switch so as to cause its contacts to close, said heating-means including line-voltage-responsive energizing-circuit means for initially heating the thermally responsive switch when said line-terminals first have electrical energy applied thereto, said heating-means also including current-responsive energizing-circuit means for thereafter heating the thermally responsive switch sufficiently to hold its contacts closed in response to the current flowing in a line-terminal of said motor, and start-run means including circuit-conductors and switching-means operable after the motor has started; said start-run means, in its non-operated position, serving to energize said line-voltage-responsive heating-means, and at the same time serving to connect said starting-winding between a plurality of line-terminals of said motor; and said start-run means, in its operated position, serving to disconnect both said line-voltage-responsive heating-means and said starting-winding from the line-terminals.

12. A delayed-start electric motor having a main running-winding, an auxiliary starting-winding, line-terminals adapted to be energized, at times, with electrical energy for said motor, a thermally responsive switch having initially open contacts serially connected in one of said line-terminals, heating-means for directly heating said thermally responsive switch so as to cause its contacts to close, said heating-means including line-voltage-responsive energizing-circuit means for initially heating the thermally responsive switch when said line-terminals first have electrical energy applied thereto, said heating-means also including current-responsive energizing-circuit means for thereafter heating the thermally responsive switch sufficiently to hold its contacts closed in response to the current flowing in a line-terminal of said motor, and start-run means including circuit-conductors and switching-means operable after the motor has started; said start-run means, in its non-operated position, serving to energize said line-voltage-responsive heating-means, and at the same time serving to connect said starting-winding between a plurality of line-terminals of said motor; and said start-run means, in its operated position, serving to disconnect both said line-voltage-responsive heating-means and said starting-winding from the line terminals.

13. A motor as defined in claim 6, characterized by the heating-element of the thermally responsive switch being of such design as to be substantially uninjured by the current therethrough when the motor is at a standstill, and also of such design as to provide sufficient heat to hold the switch-contacts of the thermally responsive switch closed when the motor is running in its lowest-load condition.

14. A motor as defined in claim 7, characterized by the heating-element of the thermally responsive switch being of such design as to be substantially uninjured by the current therethrough when the motor is at standstill, and also of such design as to provide sufficient heat to hold the switch-contacts of the thermally responsive switch closed when the motor is running in its lowest-load condition.

15. A motor as defined in claim 12, characterized by the current-responsive heating-means of the thermally responsive switch being of such design as to be substantially uninjured by the current therethrough when the motor is at standstill, and also of such design as to provide sufficient heat to hold the switch-contacts of the thermally responsive switch closed when the motor is running in its lowest-load condition.

16. A delayed-connection device subject to different temperature-conditions, comprising, in combination with said device, line-terminals adapted to be energized, at times, with electrical energy, a time-delay switching-means having initially open contacts operatively associated with said device in such manner as to effectively energize at least a portion of said device only after said contacts are closed, and electro-responsive means for actuating said time-delay switching-means so as to cause its contacts to close; said electro-responsive means including line-voltage-responsive energizing-circuit means for initially energizing said time-delay switching-means when said line-terminals first have electrical energy applied thereto, and including current-responsive energizing-circuit holding-means responsive to the current flowing in a line-terminal of said delayed-connection device.

17. A delayed-start electric motor having a main running-winding, an auxiliary starting-winding, line-terminals adapted to be energized, at times, with electrical energy for said motor, a time-delay switching-means having initially open contacts serially connected in one of said line-terminals, electro-responsive means for actuating said time-delay switching-means so as to cause its contacts to close, said electro-responsive means including line-voltage-responsive energizing circuit means for initially energizing said time-delay switching-means when said line-terminals first have electrical energy applied thereto, said electro-responsive means also including current-responsive energizing-circuit means for thereafter holding said contacts closed in response to the current flowing in a line-terminal of said motor, and start-run means including circuit-conductors and switching-means operable after the motor has started; said start-run means, in its non-operated position, serving to energize said line-voltage-responsive means, and at the same time serving to connect said starting-winding between a plurality of line-terminals of said motor; and said start-run means, in its operated position, serving to disconnect both said line-voltage-responsive means and said starting-winding from the line-terminals.

18. A delayed-start electric motor having a main running-winding, an auxiliary starting-winding, line-terminals adapted to be energized, at times, with electrical energy for said motor, a time-delay switching-means having initially open contacts serially connected in one of said line-terminals, electro-responsive means for actuating said time-delay switching-means so as to cause its contacts to close, said electro-responsive means including line-voltage-responsive energizing-circuit means for initially energizing said time-delay switching-means when said line-terminals first have electrical energy applied thereto, said electro-responsive means also including current-responsive energizing-circuit means for thereafter holding said contacts closed in response to the current flowing in a line-terminal of said motor, and start-run means including circuit-conductors and switching-means operable after the motor has started; said start-run means, in its non-operated position, serving to energize said line-voltage-responsive means, and at the same time serving to connect said starting-winding between a plurality of line-terminals of said motor; and said start-run means, in its operated position, serving to disconnect both said line-voltage-responsive means and said starting-winding from the line-terminals and from each other.

WENDELL C. SPEAR.